United States Patent [19]

Nishiyama et al.

[11] 4,354,996
[45] Oct. 19, 1982

[54] METHOD FOR MAKING A PLASTIC CONTAINER

[75] Inventors: Seiichi Nishiyama, Kawasaki; Muneki Yamada, Ebina, both of Japan

[73] Assignee: Toyo Seikan Kaisha, Ltd., Tokyo, Japan

[21] Appl. No.: 223,794

[22] Filed: Jan. 9, 1981

[51] Int. Cl.³ .............................................. B29C 3/00
[52] U.S. Cl. .................................. 264/322; 264/323
[58] Field of Search .............................. 264/323, 322

[56] References Cited

U.S. PATENT DOCUMENTS

| | | |
|---|---|---|
| 3,463,350 | 8/1969 | Unger . |
| 3,757,718 | 9/1973 | Johnson ........................... 264/323 |
| 3,923,190 | 12/1975 | Roth . |
| 4,082,854 | 4/1978 | Yamada et al. . |
| 4,102,974 | 7/1978 | Boni . |
| 4,120,932 | 10/1978 | Roth . |
| 4,122,147 | 10/1978 | Vrcelj . |
| 4,151,136 | 4/1979 | Cornell . |
| 4,182,457 | 1/1980 | Yamada et al. . |
| 4,206,628 | 1/1980 | Miller . |
| 4,210,013 | 7/1980 | Miller . |
| 4,210,573 | 1/1980 | Cornell . |
| 4,212,185 | 7/1980 | Miller . |

FOREIGN PATENT DOCUMENTS 52-141785  2/1977  Japan .

Primary Examiner—Thomas P. Pavelko
Attorney, Agent, or Firm—Armstrong, Nikaido, Marmelstein & Kubovcik

[57] ABSTRACT

While a portion of a blank made of molecularly orientable plastic resin, which is to be formed into the flange portion of a cup-shaped container, and another portion of the blank, which is to be formed into the bottom wall portion of the container are individually compressed at the molecularly orientable temperature, the portion to be formed into the bottom wall portion is introduced into a die cavity, to form the side wall portion of the container with the material extended by the compressing operation, thereby to form a cup-shaped container with a flange portion.

11 Claims, 11 Drawing Figures

METHOD FOR MAKING A PLASTIC CONTAINER

BACKGROUND OF THE INVENTION

This invention relates to a method for making a plastic container, and more particularly to a method of manufacturing a cup-shaped container with a flange which is improved in transparency, strength, gas barrier properties and wall thickness distribution, and has a small wall thickness and a large ratio of height to diameter.

A plug-assist air-pressure forming method has been proposed and practically employed in the art in order to form a cup-shaped container which is excellent in transparency, strength and gas barrier properties and small in wall thickness. In the method, while the peripheral portion of a blank which is made of a thermoplastic resin sheet is restrained, a plug is pushed into a die cavity and at the same time compressed air is supplied or vacuum is applied; that is, drawing and expanding processes are employed in combination, to form a cup-shaped container. Since an expanding process is included in the method, if the forming depth is great, the thickness of the side wall portion, especially the corner portion at the lower end of the side wall portion is reduced, and accordingly these portion are liable to break readily. Thus, it is difficult to manufacture a plastic container having a side wall portion or a bottom wall portion which is uniform in thickness. In other words, it is substantially impossible to form a cup-shaped container whose height is larger than its diameter, according to this prior art method.

Furthermore, a method of manufacturing a cup-shaped container with a flange has been disclosed in the specification of U.S. Pat. No. 4,122,147. In this method, thermoplastic plastic resin at an elevated temperature is compressed between a lower plunger having an outside diameter substantially equal to the inside diameter of the die cavity and an upper plunger whose diameter is smaller by the amount of desired thickness of the container side wall portion. This compression squeezes the plastic resin into the peripheral groove at the upper end portion of the cavity thereby to form the flange portion. While the plastic resin is being squeezed from between the upper and lower plungers, the upper and lower plungers are moved down the cavity to form the side wall portion, thus forming the cup-shaped plastic container with a flange portion. In this method, as indicated in the example in the specification, the formation is carried out with the plastic resin in molten state at a far higher temperature than its melting point (polyethylene powder having a density of about 0.95 g/cc (whose melting point is about 130° C.) being heated to about 180° C., and the upper plunger compressing the plastic resin being at 176° C.) and at high fluidity. A large quantity of filler such as mica is added in order to improve the gas barrier characteristic of the formed container. Accordingly, it is difficult to manufacture a container excellent in transparency and strength. In view of the gas barrier characteristic and strength, it is difficult to provide a container small in wall thickness. The specification indicates that the thickness of the side wall portion is 0.8 mm. In the method, the container is formed under the condition that the flange portion is not pressed in the vertical direction. Therefore, in the case where the forming temperature is high as described above, burrs are liable to be created on the peripheral edge of the flange portion. On the other hand, in the case where the forming temperature is close to the melting point or lower than the melting point, the flange portion is liable to be wrinkled.

SUMMARY OF THE INVENTION

Accordingly, an object of this invention is to provide a method of manufacturing a can-shaped plastic container at high rate which has a large ratio of height to diameter, and a thin and very uniform wall thickness.

Another object of the invention is to provide a method of manufacturing a plastic container in which the transparency, strength and gas barrier properties are much improved.

Yet another object of the invention is to provide a method of manufacturing a plastic container in which the flange portion is thin, uniform in thickness, and no burrs or wrinkles are created. In this manner, a heat sealed portion or a double seamed portion for hermetically sealing the container with a lid can be readily and securely formed.

A further object of the invention is to provide a method of manufacturing a plastic container which can be subjected to retort sterilization.

A still further object of the invention is to provide a method of manufacturing a plastic container wherein there can be utilized high molecular materials which have been very difficult to be used as constituent materials for a cup-shaped plastic container according to the conventional melt-forming methods.

In the plastic container manufacturing method according to the invention, while a portion of a blank made of molecularly orientable plastic resin, which is to be formed into a container flange portion, and another portion which is to be formed into a bottom wall portion are individually compressed at the molecularly orientable temperature thereof, the portion which is to be formed into the bottom wall portion is introduced into a die cavity to form a side wall portion of the container with the resin extended by the compression, thereby to form a cup-shaped container with a flange portion.

The method according to the invention has advantages that, the material extended by the compression is transparent because it has been molecularly oriented, the produced side and bottom wall portions are excellent in strength and gas barrier properties although it is thin in wall thickness. No burrs or wrinkles are created on the flange portion because the latter is compressed in the vertical direction at a temperature close to or lower than the melting point of the material.

In a plastic container manufacturing method of this type, the container forming rate depends on the rate of squeezing the material which is extended into the gap between the cavity and the upper plunger. However, in the method according to the invention, the material is extended also from the portion of the blank which is to be formed into the flange. Therefore, the method of the invention is advantageous in that the container forming rate is much higher than that in the conventional method.

Further, according to the invention, the thickness of the flange portion is determined by the compression force of a pad which will be explained hereinafter or the final relative position of the pad and the shoulder portion of. The cavity, the thickness of the side wall portion is determined by the gap between the cavity and the upper plunger. The thickness of the bottom wall portion is determined by the final relative position of the upper and lower plungers, that is, the thicknesses of the respective portions of the container are determined by the geometric configurations of the parts of the device used. Accordingly, there is another advantage that the respective portions of the container according to the invention can be readily formed to have a very uniform thickness and the thickness can be readily controlled to a desired value in respective portions of the container.

The method according to the invention has a still further advantage that high molecular materials can be utilized which have been unable to be used as constituent materials of a cup-shaped plastic container having a large ratio of height to diameter according to the conventional forming method. Since resins such as cellulose-type resins, polyacrylonitrile resin, polyvinylidene chloride resin, polyvinyl alcohol resin etc. have thermally disintegrating temperatures that are very close to the melting points or softening points thereof, these resins can not be subjected to conventional melt-processing methods such as blow-molding or injection molding methods etc. Even if these resins can be formed into sheet or film by some methods, it is impossible to form a container having a uniform wall thickness and a large ratio of height to diameter with the sheet or film of these resins by using conventional air-pressure forming methods or vacuum forming methods. For the above reason, these resins are usually employed in the form of a copolymer with other monomers or a blend containing a large amount of plasticizers to improve their processing performance, which will lead to the degradation of physical properties. According to the invention, there can be provided a cup-shaped container having a uniform wall thickness and a large ratio of height to diameter by heating a blank made of the monomeric one of the above resins or a laminate or a blend comprising one of the above resins precisely to a given temperature below the thermal decomposition temperature of the resin.

The foregoing objects and other objects as well as the characteristic features and advantages of the invention will become more apparent from the following detailed description and the appended claims when read in conjunction with the accompanying drawings, in which like parts are designated by like reference numerals or characters.

BRIEF DESCRIPTION OF THE DRAWINGS

In the accompanying drawings:

FIG. 1 is a vertical sectional view of an apparatus for practicing the method of the invention, showing a state of the apparatus ready for forming the container, FIG. 2 a vertical sectional view showing a state of the apparatus during the formation of the container, and FIG. 3 also a vertical section view shown a state of the apparatus that the container has been formed;

DETAILED DESCRIPTION OF THE PREFERRED EMBODIMENTS

Figure 3:
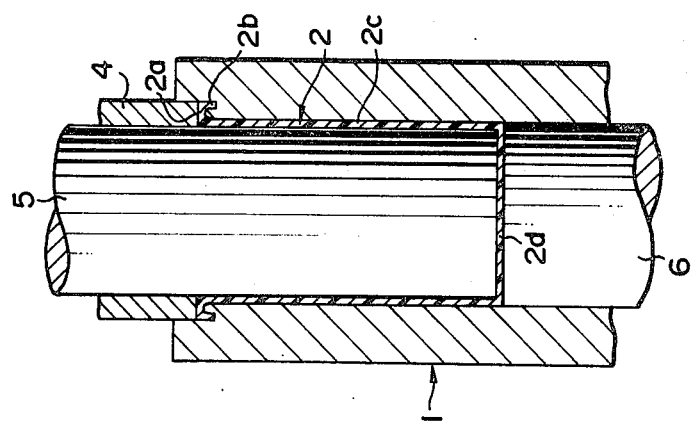
FIGS. 1 through 3 are schematic diagrams for explaining the procedure of forming a cup-shaped plastic container according to the method of this invention. More specifically.
Figure 2:
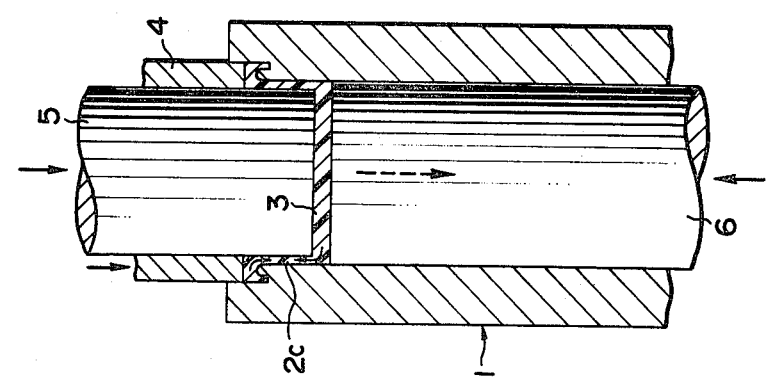
Figure 1:
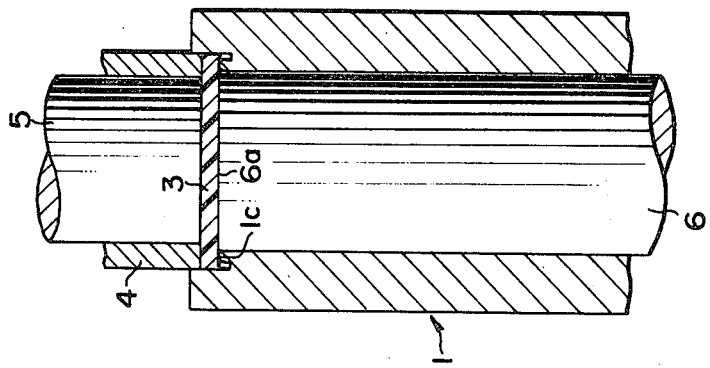
Figure 4:
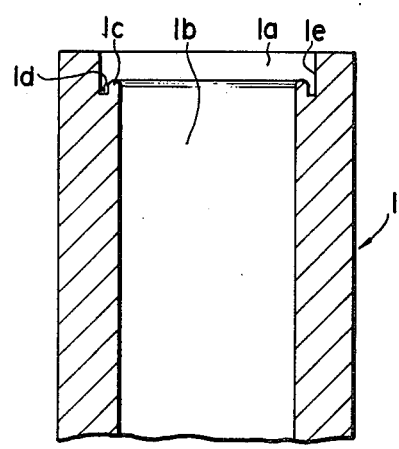
FIG. 4 is a vertical sectional view showing a die in the apparatus shown in FIG. 1.
Figure 5:
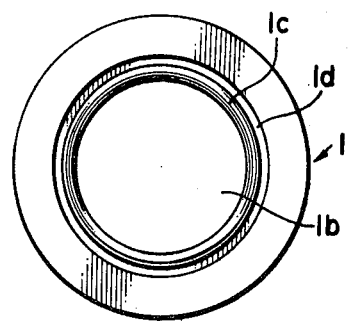
FIG. 5 is a plan view of the die in FIG. 4.

A die 1 in FIGS. 1 through 3 has a first cavity 1a and a second cavity 1b as shown in FIGS. 4 and 5. The shoulder portion 1c of the second cavity 1b serves as the peripheral bottom portion of the first cavity 1a. A peripheral groove 1d is formed along the outer wall of the shoulder portion 1c. The peripheral groove 1d is provided to form a skirt portion 2b for the flange portion 2a of a plastic container 2 which is formed with the die 1. Therefore, the provision of the peripheral groove 1d is unnecessary in case where the provision of the skirt portion 2b is unnecessary. A pad 4 which is slidable along the inner wall 1e of the first cavity 1a and has a center bore is provided above the shoulder portion 1c of the die 1. The pad 4 is adapted to compress the peripheral portion of a blank 3 to form the flange portion 2a. A first plunger 5 is inserted into the pad 4 in such a manner that it is slidable along the inner wall of the pad 4. The outside diameter of the first plunger 5 is dimensioned substantially equal to the inside diameter of the side wall portion of the plastic container 2. As best shown in FIG. 3, while the first plunger 5 is pushed into the second cavity 1b, the side wall portion 2c of the plastic container 2 is formed between the first plunger 5 and the second cavity 1b. Accordingly, it is necessary that the inside diameter of the second cavity 1b be substantially equal to the outside diameter of the side wall portion 2c of a plastic container 2 to be formed and the height of the second cavity 1b be larger than that of the side wall portion 2c of the plastic container 2. A second plunger 6 is provided in such a manner that it is slidable along the inner wall of the second cavity 1b and confronts the first plunger 5. The second plunger 6 is moved downwardly in the second cavity 1b while pressing the central portion of the blank 3 in cooperation with the first plunger 5, to form the side wall portion 2c.

With the above-described device, a plastic container 2 is formed as follows:

First, a blank 3 heated to a predetermined temperature is placed on the shoulder portion 1c. The blank 3 is made of a molecularly orientable thermoplastic resin. Examples of the molecularly orientable thermoplastic resins are polyolefin resins such as polypropylene, high density polyethylene, medium density polyethylene, and low density polyethylene, linear polyester resins such as polyethylene terephthalate, polycarbonate resin, polyvinyl chloride and nitrile resin; or the copolymers or blends of these resins; or laminates formed with main layers of these orientable thermoplastic resins and a layer of gas barrier resins such as ethylene vinyl-alcohol copolymer, polyamide, cellulose-type resins, polyacrylonitrile, polyvinylidene chloride, and polyvinyl alcohol; or blends containing these orientable thermoplastic resins as a main ingredient and gas barrier resins. Especially, a laminate or a powder blend essentially containing polypropylene and ethylene vinyl-alcohol copolymer is excellent in transparency and gas barrier characteristic against oxygen and water vapor. In addition, the laminate or the powder blend is scarcely contracted even at 100° C. or higher after being formed and thus can withstand a high temperature sterilization. Accordingly, it is most suitable as a material for forming a container for solid food or juice.

The blank 3 is provided by cutting a sheet having a predetermined thickness; however, it may be one which is formed from a powder or a thicker cut sheet to have predetermined dimensions by the above-described device (as described later).

In general, the blank 3 is substantially uniform in thickness throughout its area, and the thickness is not larger than the height of the first cavity 1a and determined from the total surface area and the thickness of a plastic container to be produced. Usually, the thickness of the blank 3 is about 1 to 5 mm, and the diameter is substantially equal to the inside diameter of the first cavity 1a, or may be smaller than the latter. It is desirable that the configuration of the blank be substantially equal to that of the cross section of the plastic container side wall portion. More specifically, it is desirable that if the configuration of the cross section is circular, then the blank is circular, and if square, then square. However, it is not always required that both be identical in configuration, because there may be a container which has a square flange portion and a cylindrical side wall portion. In compressing the flange portion 2a with the pad 4, the blank material of the flange portion is extended outwardly also, and therefore the contour of the flange portion coincides with that of the inner wall 1e of the first cavity. Accordingly, if, even in case where a container has a cylindrical side wall portion 2c, the blank is formed into a square or a regular octagon, then the yield of forming the blanks is improved, i.e. the blank providing material can be used more economically.

During the formation of the container, it is necessary that the material is maintained at a temperature at which the molecular orientation is effected. Accordingly, the blank 3 is placed on the shoulder portion 1c after being heated to the temperature, or it is heated to the temperature after being placed on the shoulder portion 1c. The former method is preferable in the standpoint of work efficiency.

The term "molecularly orientable temperature" as used herein is intended to mean a temperature such that, in the side wall portion, flange portion and bottom wall portion of the container manufactured according to the invention, the high-molecular chain of a molecularly orientable plastic resin is oriented more than that in an ordinary melt molding, as the result of which the mechanical strength, the gas barrier property or the transparency is improved. More specifically, the term "molecularly orientable temperature" is intended to mean a temperature such that a two-dimensional orientation coefficient is 0.05 or more as described in the specification of U.S. Pat. No. 4,182,457. In the case of high crystalline resins such as polypropylene or polyethylene, the molecularly orientable temperature is not higher than a temperature which is higher by 35° C. than the melting point thereof and a temperature at which the resin is moldable. In the case of polyester resin such as polyethylene terephthalate the molecularly orientable temperature is not lower than the glass transition temperature and not higher than the crystallizing temperature. In the case of amorphous high-molecular material such as polyacrylonitrile resin, the molecularly orientable temperature is not higher than a temperature which is higher by 35° C. than the glass transition temperature thereof and a temperature at which the material is moldable.

In case where the blank 3 is a laminate which essentially contains polyolefin resin and ethylene vinyl-alcohol copolymer, the molecularly orientable temperature is not higher than a temperature which is higher by 35° C. than the melting point of the polyolefin resin, and not lower than $(1.64x+20)$°C. where x is the vinyl alcohol content (in Mol %) of the copolymer. In the case of a plate-shaped blank made of the powder molded material of a blend of polyolefin resin powder and ethylene vinyl-alcohol copolymer powder, the molecularly orientable temperature is not higher than a temperature which is higher by 35° C. than the melting point of the polyolefin resin, and not lower than $(1.64x+40)$°C. The reason why the lower limit temperature in the latter case is higher than that in the former case is as follows: In the former case, as indicated in Practical Example 1, the layer of polyolefin resin is usually bonded through an adhesive layer with the layer of ethylene vinyl-alcohol copolymer. However, in the latter case, no bonding utilizing such an adhesive layer is employed, and therefore in forming a blank at a temperature lower than the aforementioned temperature which is lower than the melting point $(1.64x+68)$°C. of ethylene vinyl-alcohol copolymer, polyolefin resin particles are separated from ethylene vinyl-alcohol copolymer particles at the interfaces, as the result of which the gas barrier and transparency effects are lost.

Usually the melting point of a crystalline or semicrystalline high molecular material is determined according to the differential thermal analysis method, the specific heat-temperature curve method, the polarizing microscopic method, the X-ray diffraction method, the infrared absorption spectrum method and the like. Strictly speaking, the above melting point should be indicated by a temperature range, since the crystalline structure and size of the high molecular material are not uniform and have a wide range of distribution. However, in the case of the differential thermal analysis method (or the differential calorimetric method) which is most widely used for measuring the melting point, the melting point is usually indicated by the temperature corresponding to the peak of the endothermic curve determined at the atmospheric pressure. The term "melting point" as used herein is intended to mean the above-mentioned temperature. On the other hand, in case where a high molecular material is compressed under a higher pressure than the atmospheric pressure, the actual melting point or the actual glass transition temperature will be raised. Accordingly, the reasons why, as described above, molecular orientation is effected at a temperature somewhat higher than the "melting point" defined above according to the method of the invention are esteemed that (1) micro-crystallines still remain at a temperature slightly higher than the "melting point", and (2) a high pressure is applied to the resin during forming.

In order that the forming body be maintained at a temperature in the above-described molecularly orientable temperature range during the formation, the temperatures of the die 1, the pad 4, the first plunger 5, and the second plunger 6 are adjusted to the molecularly orientable temperature of the resin employed or the temperature lower than the above temperature by means of a heater, an oil heating pipe, a water cooling pipe or the like, when necessary. It is preferable that the temperature thus adjusted be as low as possible as far as the forming body is maintained at the molecularly orientable temperature range of the relevant material, to facilitate the cooling and solidifying of a produced container 2.

Before the blank 3 is placed on the shoulder portion 1c, the second plunger 6 is so set that its end face 6a is preferably flush with the upper surface of the shoulder portion 1c as shown in FIG. 1, so as to allow the end face 6a to be in contact with the lower surface of the central portion of the blank, thereby to prevent the drooping of the central portion of the blank. Simultaneously when the first and second plungers move downwardly, the pad 4 starts compressing the blank peripheral portion, as the result of which the material of the blank peripheral portion is extended into the peripheral groove 1d and radially inwardly. As the first and second plungers 5 and 6 move down the second cavity 1b while compressing the central portion of the blank 3, as indicated by the arrow in the left half of FIG. 2 the material on the shoulder portion 1c is extended in the direction of the arrow into the gap between the outer wall of the first plunger 5 and the second cavity 1b. At the same time, the material of the central portion of the blank which is being compressed by the first plunger 5 and the second plunger 6 is extended in the direction of the arrow, thus forming the side wall portion 2c. In other words, as the plungers are moved into the second cavity 1b while compressing the central portion of the blank, the thickness of the blank is gradually reduced, and the side wall portion 2c is formed in the aforementioned gap with the material corresponding to the reduction of the blank thickness. The side wall portion 2c is molecularly oriented because it is formed with the material which is compressed and extended at the molecularly orientable temperature. The bottom wall portion 2d is also molecularly oriented. The flange portion 2a is never creased, since it is pressed during the formation. As the material fluidity is not high during the formation, burrs are scarcely formed on the flange portion 2a.

It is important that during the formation the rate of supplying the material into the above-described gap is in balance with the rate of lowering the plungers. If the material supplying rate is lower than the plunger lowering rate, then the side wall portion 2c may be non-uniform in thickness or at worst holes may be created in the side wall portion 2c. In this case, it is difficult to produce satisfactory containers. If the plunger lowering rate is much slower than the material supplying rate, then the productivity is lowered, and the material may be broken because the temperature of the material is reduced to a lower one than its molecularly orientable temperature. Accordingly, it is necessary that the material supplying rate, i.e. a material extending rate is determined from the material, size and heating temperature of a blank to be used, temperatures of tools such as the plungers, and a pressure to be applied to the blank through experiments in advance, and the plunger lowering rate is determined from the material supplying rate. In case where the material supplying rate, i.e. a material supplying quantity is changed during the formation, it is necessary to adjust the plunger lowering rate according to the change of the material supplying quantity.

The material compressing pressure, of course, depends on a kind of resin to be used; however, in general, a satisfactory result is obtained by setting the pressure to 400 to 2000 kg/cm$^2$. In this case, it is possible to set the plunger lowering rate, i.e. a formation rate, to about 200 mm/sec, and it is also possible to obtain a plastic container whose side wall portion is about 0.2 mm in thickness.

According to the invention, a plastic container 2 substantially uniform in wall thickness is obtained as shown in FIG. 3. In case where it is required to increase the container's strength against the internal pressure (for instance in case where the containers are filled with carbonated drinks), the bottom wall portion 2d may be made thicker than the side wall portion 2c or may be made in the form of a dome curved inwardly or outwardly.

A plastic container like a so-called "can" having a ratio of side wall portion height to diameter of 2 to 3 can be produced according to the above-described method.

To form a plastic container having such a ratio, the first and second plungers are introduced into the second cavity for a distance about 2 to 3 times as large as the inside diameter of the second cavity which is substantially the same as the diameter of the container formed therein. It is preferable that, after being formed, the container is quickly cooled to the solidifying temperature by operating a cooling means built in the die, such as a water cooling pipe or brine circulating pipe (for example, at about $-30°$ C.), and then the plastic container 2 is withdrawn by lifting the pad 4 and the first and second plungers 5 and 6. After being filled with the desired contents, the container 2 is sealed by heat-sealing or double-seaming the flange portion 2a.

Hereinbelow will be explained another embodiment of the method according to the invention.

Figure 6:
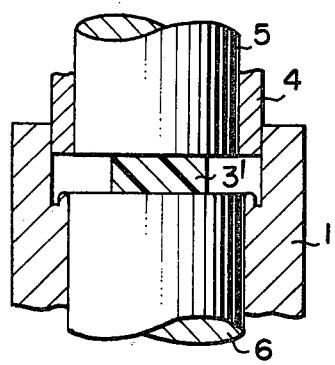
FIG. 6 is a vertical sectional view of the apparatus in which a stock different from that in FIG. 1 is charged.
Figure 7:
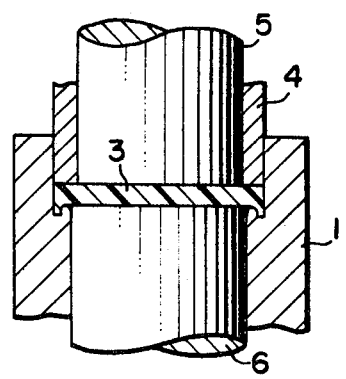
FIG. 7 is a vertical sectional view of the apparatus which is ready for forming a container with the stock shown in FIG. 6.

As shown in FIG. 6, the area of a molecularly orientable plastic stock 3' may be smaller than the area of the end face 6a of the second plunger 6. In this case, the lower surface of the first plunger 5 is set flush with the lower surface of the pad 4, and the first plunger 5 and the pad 4 are simultaneously moved downwardly to compress the stock 3'. Then, when the compressibility reaches a certain value, as shown in FIG. 7, the same blank 3 as that in FIG. 1 (with the skirt portion formed) is obtained. Thereafter, the formation of a container is carried out in the above-described manner.

Figure 8:
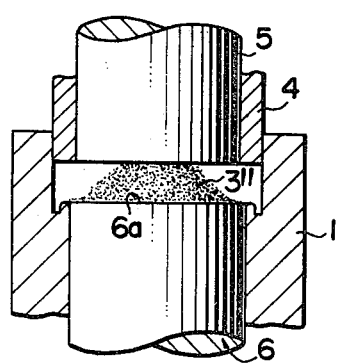
FIG. 8 is a vertical sectional view of the apparatus in which a stock different from those in FIGS. 1 and 6 is charged.

As shown in FIG. 8, a stock 3" may be a molecularly orientable plastic powder, or a blend thereof with a powder of the other resin. In this case, first the stock 3" is heated to a temperature higher than the melting point of the relevant plastic resin (in the case of the blend, higher than the highest of the melting points of the different powders in the blend). Then, similarly as in the case of FIG. 6, both of the first plunger 5 and the pad 4 are simultaneously moved downwardly to a suitable level to compress the powder stock 3". As a result, a blank 3 as shown in FIG. 7 is obtained.

Now, one example of an apparatus for practicing the above-described method will be described with reference to FIGS. 9 and 10, in which those components which have been previously described with reference to FIGS. 1 through 5 are therefore similarly numbered.

Figure 9:
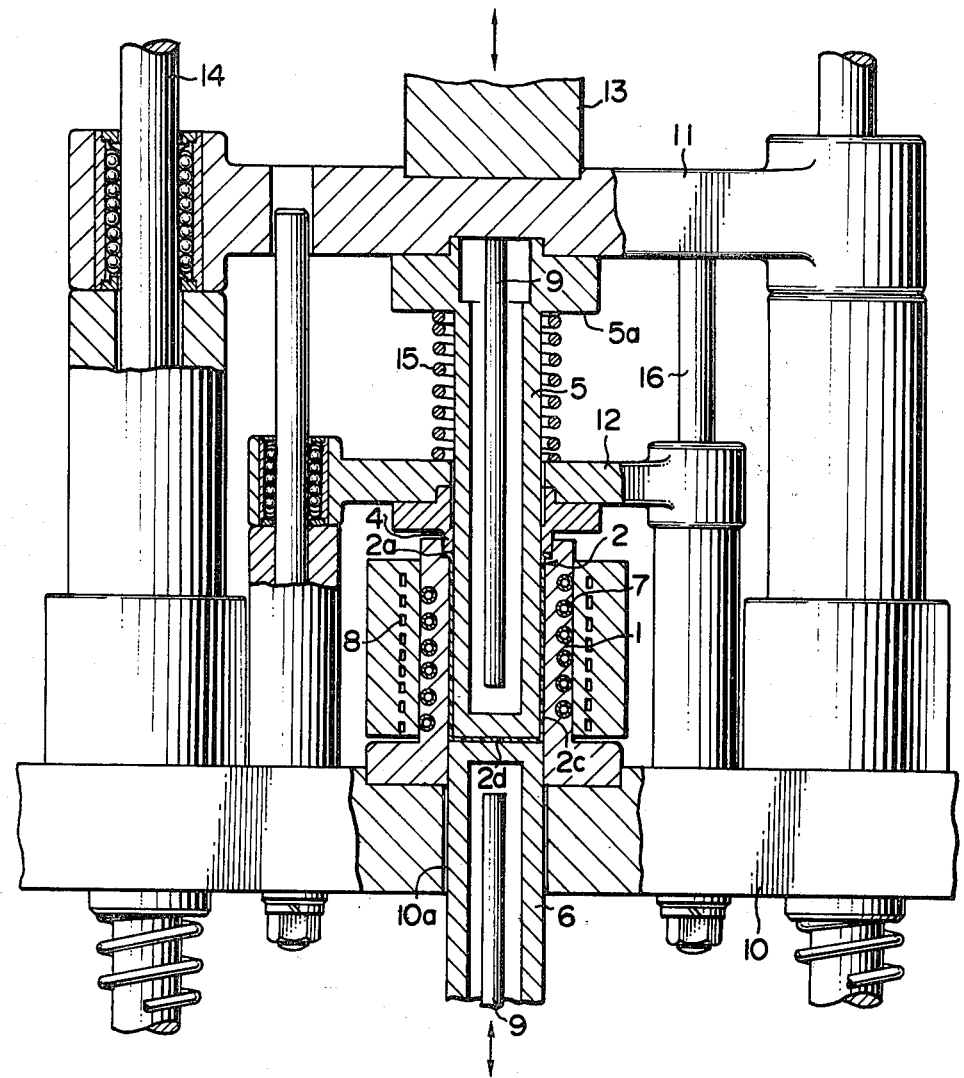
FIG. 9 is a vertical sectional view of one example of the apparatus for practicing the method of the invention, showing a state of the apparatus that a container has been formed.

FIG. 9 shows a state of the apparatus when the formation has been accomplished. In this state, the flange portion 2a of the container 2 is compressed by the pad 4 and the die 1, the bottom wall portion 2d is compressed by the first plunger 5 (hereinafter referred to "the upper plunger 5" when applicable) and the second plunger 6 (hereinafter referred to "the lower plunger 6" when applicable), and the side wall portion 2c is formed in the gap between the upper plunger 5 and the die 1.

A cooling pipe 7 is built in the die 1, and is surrounded by a heating coil 8. Cartridge heaters 9 are provided inside the upper plunger 5 and the lower plunger 6 to control the temperatures of the latter, respectively.

The die 1 is fixedly secured to a base 10. The lower plunger 6 is moved up and down through a through-hole 10a in the base 10 by a hydraulic cylinder 18 (FIG. 10). The upper plunger 5 is fixedly secured to a ram 11 and is slidably moved up and down through the pad 4 and a central hole formed in a pad plate 12 to which the pad is fixedly mounted. The ram 11 is fixedly fastened to a piston rod 13 which is moved vertically by a hydraulic cylinder 17 (FIG. 10). The end portions of the ram 11 are guided by guide shafts 14 secured to the base 10. A coil spring 15 is disposed between the upper surface of the pad plate 12 and the lower surface 5a of the flange of the upper plunger 5. The pad 4 exerts a depressing force through the spring 15 on the flange portion 2a while the plungers are being moved downwardly.

As the apparatus is constructed as described above, in withdrawing the upper plunger 5 from the produced container the flange portion 2a is maintained depressed by the pad 4, and therefore the upper plunger 5 can be smoothly pulled out. The end portions of the pad plate 12 are guided by the guide shafts 16 secured to the base 10.

Figure 10:
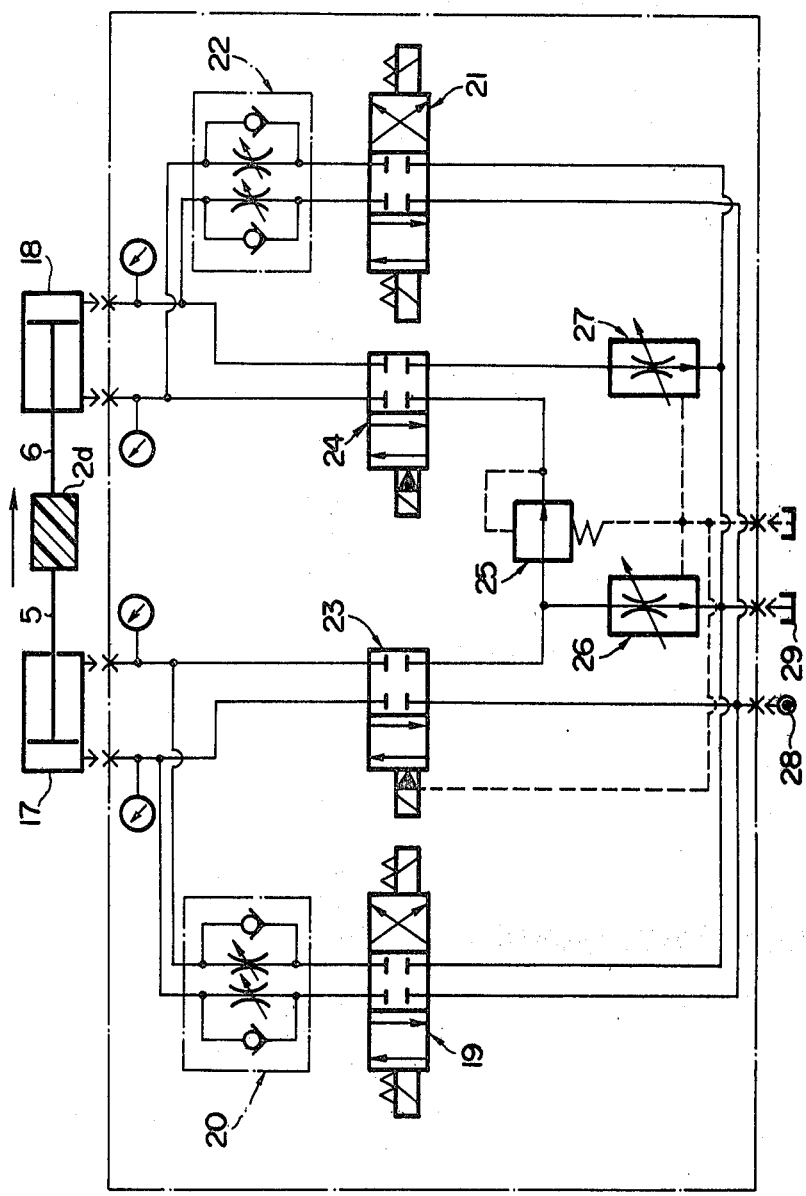
FIG. 10 is a connection diagram showing a hydraulic circuit for operating the apparatus shown in FIG. 9.

FIG. 10 shows a hydraulic circuit for driving the plungers in the above-described apparatus. In FIG. 10, reference numerals 17 and 18 designate the above-described hydraulic cylinders for driving the upper plunger 5 and the lower plunger 6, respectively. The pressure receiving area of the hydraulic cylinder 18 is slightly larger than that of the hydraulic cylinder 17 for the following reason: the rate of lowering the lower plunger 6 is made slightly lower than the rate of lowering the upper plunger 5, to facilitate the control of the compression force applied to the bottom portion 2d.

A circuit made up of a solenoid valve 19 and a flow regulator 20 is provided to solely operate the upper plunger 5, and a circuit made up of a solenoid valve 21 and a flow regulator 22 is provided to solely operate the lower plunger 6. Sequential operations such as lifting only the upper plunger 5 after the formation of the container, withdrawing the plastic container from the die 1 by lifting the lower plunger 6 after the pad 4 has left the flange portion 2a, lowering the upper plunger 5 in succession with the withdrawal of the container and positioning the two plungers for the next container formation are carried out by the operations of limit switches (not shown).

A circuit comprising solenoid valves 23 and 24, a reducing valve 25 and flow control valves 26 and 27 is to drive the upper plunger 5 and the lower plunger 6 during the container formation. High pressure oil from a hydraulic pressure source 28 is delivered through the solenoid valve 23 to the piston side of the hydraulic cylinder 17 to move the upper plunger 5 in the direction of the arrow, as the result of which the oil on the plunger side is delivered through the solenoid valve 23. A part of the oil is returned through the flow control valve 26 to an oil tank 29, while the remaining larger part of the oil is delivered through the reducing valve 25 and the solenoid valve 24 to the plunger side of the hydraulic cylinder 18. As the quantity of oil flowing into the cylinder 18 is smaller than that flowing into the cylinder 17, the movement of the lower plunger 6 in the direction of the arrow is delayed as much when compared with the movement of the upper plunger. Thus, the thickness of the bottom wall portion 2d is reduced as much as a distance corresponding to this delay. Accordingly, if the flow control valve 27 adapted to determine the rate of moving the lower plunger 6 and the flow control valve 27 concerning the amount of extension of the bottom wall portion (2d) material are controlled according to the amount of extension of the material in the compressing section, then the plastic container 2 with the side wall portion 2c uniform in thickness can be formed at high rate.

The invention will now be described by reference to the following Practical Examples.

PRACTICAL EXAMPLE 1

Figure 11:
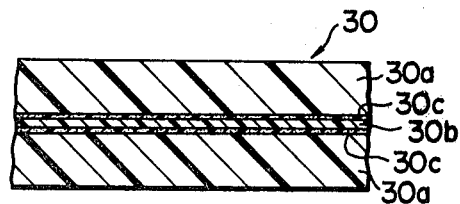
FIG. 11 is a vertical sectional view of a sheet from which is formed one example of the blank employed for practicing the method of the invention.

Symmetric five-layer laminate sheets 30 such as illustrated in FIG. 11 having an effective width of 500 mm and a thickness of 3.0 mm and comprising two outermost layers 30a, one innermost layer 30b and two adhesive layers 30c disposed between the outermost layer 30a and the innermost layer 30b were formed by using a combination of an extruder for forming the outermost layers having a built-in full-flighted screw with a diameter of 90 mm and an effective length of 1980 mm, an extruder for forming the adhesive layers having a built-in full-flighted screw with a diameter of 40 mm and an effective length of 880 mm, and an extruder for forming the innermost layer having a built-in screw with a diameter of 40 mm and an effective length of 880 mm, a single manifold T-die equipped with a multi-channel feed block adapter, and a sheet forming machine. As the outermost layer 30a isotactic polypropylene was used having a density of 0.91 g/cm$^3$ at 20° C. and a melting point of 160° C. measured according to the differential thermal analysis method (which will be referred to the DTA method hereinafter). As the innermost layer 30b ethylene vinyl-alcohol copolymer was used consisting of 45 Mol % of ethylene and 55 Mol % of vinyl-alcohol and having a melting point by the DTA method of 154° C. and an oxygen permeability of $2.3 \times 10^{-13}$ cc.cm/cm$^2$.sec.cmHg at 37° C. and the relative humidity of 0%. As the adhesive layer 30c maleic anhydride modified polypropylene was used having a melting point by the DTA method of 159° C.

The screw rotating speeds of the respective extruders were controlled so that the thickness ratio of the outermost layers 30a:the adhesive layers 30c:the innermost layer 30b of the sheet 30 formed may be as close to 100:2:4 as possible.

Disc-shaped blanks 3 having a diameter of 60 mm were punched out from the sheet 30, and heated precisely to 159° C. by means of infrared heaters. The heated blanks were placed on the upper cavity 1a as indicated in FIG. 9 and compressed with the pad 4 under the pressure of about 1000 kg/cm$^2$. Simultaneously the upper plunger 5 and the lower plunger 6 were introduced into the lower cavity 1b by 100 mm with the velocities of 40 mm/sec. and 50 mm/sec., respectively. The die 1 and the plungers 5, 6 had been heated in advance to about 70° C. with the heating coil 8 and the cartridge heaters 9 provided inside the plungers 5, 6, respectively. The surface temperature of the container thus formed was about 80° C., and the container was readily removed without cooling out of the forming device, owing to a lubricant film applied beforehand on the surfaces of the upper and lower plungers and the lower cavity. The container has a flange portion of 0.3 mm in thickness and 60 mm in diameter and free from burrs and wrinkles, a side wall portion of 0.335±0.03 mm in thickness, 50 mm in outer diameter and 101 mm in height, and a bottom wall portion of 0.335±0.03 mm in thickness. The dimensional stability of the container by aging was satisfactory.

For comparison, a plug-assist air-pressure forming was tried to obtain a container having the same configuration as the above by using the same sheet and forming temperature as the above. Although experiments were conducted under various conditions such as changing the lowering amount of the plug and the forming pressure, there were obtained only useless containers whose side wall portion and corner between the side wall portion and the bottom wall portion are very thin (about 10 to 50 μm).

PRACTICAL EXAMPLE 2

According to the similar manner as Practical Example 1, blanks were punched from the same sheet as used in Practical Example 1, and containers having the same configuration as that in Practical Example 1 were formed.

Six varieties of containers were formed by changing the heating temperatures of the blanks prior to the forming to 130° C., 150° C., 159° C., 165° C., 190° C. and 200° C. The formed containers were removed from the forming device after cooled sufficiently by allowing a cooling water of about 10° C. to flow through the cooling pipe 7 indicated in FIG. 9.

With respect to these containers, the transparency (or haze) of the side wall portion and the bottom wall portion, the retortability, the orientation coefficients (l, m, n) of the side wall portion and the bottom wall portion determined by a fluorescence method, and the oxygen permeability rate ($Q_{o2}$) were measured. The results are shown in Table 1. The table evidently indicates the effect of the forming temperature on the properties of the formed container such as transparency, retortability and gas barrier characteristics.

TABLE 1

| Forming Temperature (°C.) | | | 130 | 150 | 159 | 165 | 190 | 200 |
|---|---|---|---|---|---|---|---|---|
| Haze[1] (%) | Side Wall Portion | | 12.0 | 6.0 | 5.0 | 6.2 | 8.3 | 15.0 |
| | Bottom Wall Portion | | 10.3 | 7.0 | 5.2 | 6.1 | 8.4 | 15.8 |
| Retortability[2] | Contraction Ratio in the Body Diameter | | 0.03 | 0.01 | 0.009 | 0.009 | 0.009 | 0.009 |
| | Contraction Ratio in the Height | | 0.04 | 0.02 | 0.01 | 0.01 | 0.008 | 0.009 |
| Two Dimensional Orientation Coefficient[3] | Side Wall Portion | l | 0.32 | 0.28 | 0.26 | 0.23 | 0.18 | 0.03 |
| | | m | 0.18 | 0.18 | 0.15 | 0.14 | 0.09 | 0.04 |
| | | n | 0.50 | 0.54 | 0.59 | 0.63 | 0.73 | 0.93 |
| | Bottom Wall Portion | l | 0.30 | 0.29 | 0.27 | 0.25 | 0.21 | 0.04 |
| | | m | 0.23 | 0.21 | 0.18 | 0.16 | 0.12 | 0.04 |
| | | n | 0.47 | 0.50 | 0.55 | 0.59 | 0.67 | 0.92 |
| Oxygen Permeability[4] ($Q_{o2}$) (cc/m² . day . atm) | | | 4.9 | 5.0 | 4.8 | 7.2 | 9.3 | 10.2 |
| Remarks | | | Poor transparency due to a low forming temperature | | | | | Poor transparency without orientation effect due to a high forming temperature |

Note:
(1) Haze: Measured according to the Japanese Industry Standards (JIS) K 6714. Square test pieces of 30 mm × 30 mm were cut from the center portions of the side wall portion and the bottom wall portion.
(2) Retortability: The containers were filled up to 90% of their volume with a mixture of water and oil (50:50 by weight), double seamed with aluminum lids, and then subjected to steam retort treatment under the vapor pressure of 1.5 kg/cm² and at 120° C. The contraction ratio, for example, of the side wall portion was determined according to the following equation:

$$\text{Contraction Ratio} = \frac{\text{Initial Body Diameter} - \text{Body Diameter after Retort Treatment}}{\text{Initial Body Diameter}}$$

(3) Two Dimensional Orientation Coefficient: Measured according to the principle and method described in Japanese Patent Publication No. 21674/1978. The average values in the innermost layer and the outermost layer were determined. By l are indicated the orientation coefficients in the direction of the height with respect to the side wall portion and in the radial direction with respect to the bottom wall portion. By m are indicated those in the circumferential direction with respect to the side wall portion and in the θ direction perpendicular to the radial direction with respect to the bottom wall portion. l+m+n=1.
(4) Oxygen Permeability: Empty containers to be measured were double seamed with aluminum lids having an opening of 10 mm in diameter, and after the air in the containers was replaced with nitrogen, the opening was sealed with a rubber stud, and the surface of the contacting area of the opening and the rubber stud was covered an epoxy-type adhesive. Subsequently, the containers were allowed to stand for a week in a constant temperature and humidity cabinet kept at 37° C. and the relative humidity of 30%, and then oxygen amounts transmitted inside the container were determined gas-chromatographically.

PRACTICAL EXAMPLE 3

By using as the outermost layers 30a the same isotactic polypropylene as used in Practical Example 1, as the adhesive layers 30c the same maleic anhydride modified polypropylene as used in Practical Example 1, and as the innermost layer 30b ethylene vinyl-alcohol copolymer consisting of 30 Mol % of ethylene and 70 Mol % of vinyl alcohol and having the melting point by the DTA method of 183° C. and the oxygen permeability (at 37° C. and the relative humidity of 0%) of $7.0 \times 10^{-14}$ cc.cm/cm$^2$.sec.cmHg, five-layer laminate sheets 30 having the same thickness and thickness ratio as those indicated in Practical Example 1 were formed by using the same sheet forming device as indicated in Practical Example 1.

Subsequently, containers having the same configuration as indicated in Practical Example 1 were formed by using the same forming device as indicated in Practical Example 1. The blanks were heated to 130° C., 135° C., 140° C., 160° C., 195° C. and 200° C. prior to the forming operation, and 6 varieties of containers were formed.

The transparency (or haze) of the side wall portion and the bottom wall portion and the oxygen permeability of these containers were determined according to the methods described in Practical Example 2. The results are shown in Table 2. As apparent from the Table, the suitable forming temperature for a container formed from a laminate including polypropylene layers having the melting point of 160° C. and an ethylene vinyl-alcohol layer having the melting point of 183° C. is ranged from 135° to 195° C.

TABLE 2

| Forming Temperature (°C.) | Haze (%) Side Wall Portion | Haze (%) Bottom Wall Portion | Oxygen Permeability $(Q_{o2})$ (cc/m$^2$ . day . atm) |
|---|---|---|---|
| 130 | 12.1 | 9.8 | 21.1 |
| 135 | 9.2 | 9.6 | 1.6 |
| 140 | 6.4 | 8.1 | 1.5 |
| 160 | 4.9 | 5.2 | 1.4 |
| 195 | 8.6 | 8.5 | 1.5 |
| 200 | 15.0 | 15.6 | 1.6 |

PRACTICAL EXAMPLE 4

Pellets of polyethylene terephthalate having a logarithmic viscosity of 0.11 l/g at 30° C. in a solvent consisting of phenol (50% by weight) and tetrachloroethane (50% by weight) were dried sufficiently by means of a drier having a built-in dehumidifier until the water content became lower than 0.005%. Disk-shaped blanks having a thickness of 3 mm and a diameter of 60 mm were formed from the pellets by a known injection forming method. The density of the blank which was measured at 20° C. by means of a density gradient tube using a mixed solution of n-heptane and carbon tetrachloride was ranged from 1.335 to 1.338 g/cm$^3$ over all the portions thereof. The both sides of the blanks were allowed to face infrared heating tubes, and after about 35 seconds the blanks were heated precisely to 100° C. Containers were formed from the heated blanks having the same configuration as that indicated in Practical Example 1 under the same forming conditions and using the same forming device as indicated in Practical Example 1, except that the die and the upper and lower plungers were preheated to about 45° C.

The thicknesses of the side wall portion, bottom wall portion and the flange portion of the thus formed container were 0.30±0.03 mm, being very uniform. No burns or wrinkles were created in the flange portion. The density of the side wall portion and the bottom wall portion ranged from 1.348 to 1.364 g/cm$^3$ at any area, and particularly the density of 1.348 to 1.355 g/cm$^3$ was observed only at the small area corresponding to the corner between the flange portion and the side wall portion, which demonstrates, as described in Japanese Patent Laid-Open Publication No. 54-130289 for example, that the container is a molecularly oriented polyethylene terephthalate one having a low contraction or shrinkage ratio after formed.

For comparison, the same disk-shaped blank was heated precisely to 100° C., and thereafter subjected to a known plug-assist air-forming method to form a container having the same configuration. However, the results were almost same as those in the case of Practical Example 1, that is, it was difficult to permit the bottom wall portion to be thin up to a desired thickness, thereby leading to the very thin side wall portion and corner between the side wall portion and the bottom wall portion, and thus satisfactory containers could not be obtained.

What is claimed is:

1. A method for making a molecularly oriented plastic container with a flange portion, a side wall portion and a bottom wall portion, a ratio of the height of said side wall portion to the diameter thereof being about 2 to 3, comprising:
   a. preparing a blank of molecularly orientable plastic resin;
   b. preparing a die having a first cavity, the inside diameter and height of which are not smaller than the inside diameter and thickness of said blank, respectively, and a second cavity having an inside diameter substantially equal to the outside diameter of said side wall portion and a height larger than the height of said side wall portion, said second cavity merging through a shoulder portion with said first cavity;
   c. preparing a hollow pad adapted to compress a portion of said blank on said shoulder portion to form said flange portion, a first plunger having an outside diameter substantially equal to the inside diameter of said side wall portion and adapted to slide through said hollow pad into said second cavity, and a second plunger having an outside diameter substantially equal to the inside diameter of said second cavity and slidable in said second cavity in confrontation with said first plunger;
   d. placing a portion of said blank, which is to be formed into said flange portion, on said shoulder portion; and
   e. maintaining said blank at a molecularly orientable temperature while compressing said blank between said first and second plungers and between said pad and said shoulder portion, said first and second plungers being simultaneously introduced into said second cavity for a distance about 2 to 3 times as large as the inside diameter of said second cavity;
   f. so that the thickness of said portion which is to be formed into said flange portion is reduced to the thickness of said flange portion of said plastic container, the thickness of said portion of said blank which has been placed on said second cavity is reduced to the thickness of said bottom wall portion, and said side wall portion is formed with the molecularly oriented resin extruded out of between said first and second plungers, in the gap between said first plunger and said second cavity.

2. A method as claimed in claim 1, in which said blank is in the form of a square or a regular polygon, and said side wall portion is cylindrical.

3. A method as claimed in claim 1, in which said first and second plungers, die and pad are maintained at a temperature not higher than the molecularly orientable temperature of a relevant resin during the formation of said plastic container.

4. A method as claimed in claim 1, in which said blank consists of a molecularly orientable polyolefin resin.

5. A method as claimed in claim 4, in which said molecularly orientable polyolefin resin blank is compressed at a temperature not higher than a temperature which is higher by 35° C. than the melting point of said molecularly orientable polyolefin resin, and not lower than the formable temperature of the same.

6. A method as claimed in claim 1, in which said blank is formed from a laminate which consists essentially of a molecularly orientable polyolefin resin layer and an ethylene vinyl-alcohol copolymer layer.

7. A method as claimed in claim 6, in which said blank is compressed at a temperature not higher than a temperature which is higher by 35° C. than the melting point of said polyolefin resin, and not lower than $(1.64x+20)°C.$ where x is the vinyl alcohol content (in Mol %) of said copolymer.

8. A method as claimed in claim 1, in which said blank is formed from a powder blend molding consisting of a molecularly orientable polyolefin resin powder and an ethylene vinyl-alcohol copolymer powder.

9. A method as claimed in claim 8, in which said blank is compressed at a temperature not higher than a temperature which is higher by 35° C. than the melting point of said polyolefin resin, and not lower than $(1.64x+40)°C.$ where x is the vinyl-alcohol content (in Mol %) of said copolymer.

10. A method as claimed in claim 1, in which said blank consists of a molecularly orientable polyester resin.

11. A method as claimed in claim 10, in which said blank is compressed at a temperature not lower than the glass transition point of said resin and not higher than the crystallizing temperature of said resin.

* * * * *